April 29, 1969     C. E. STEDMAN     3,441,244
MOLDING APPARATUS FOR MOLDING ACOUSTICAL TILE
Original Filed June 14, 1963
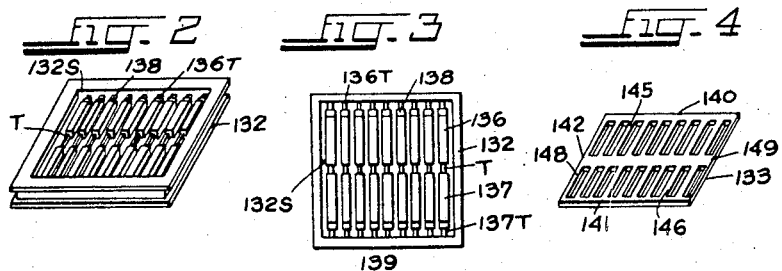
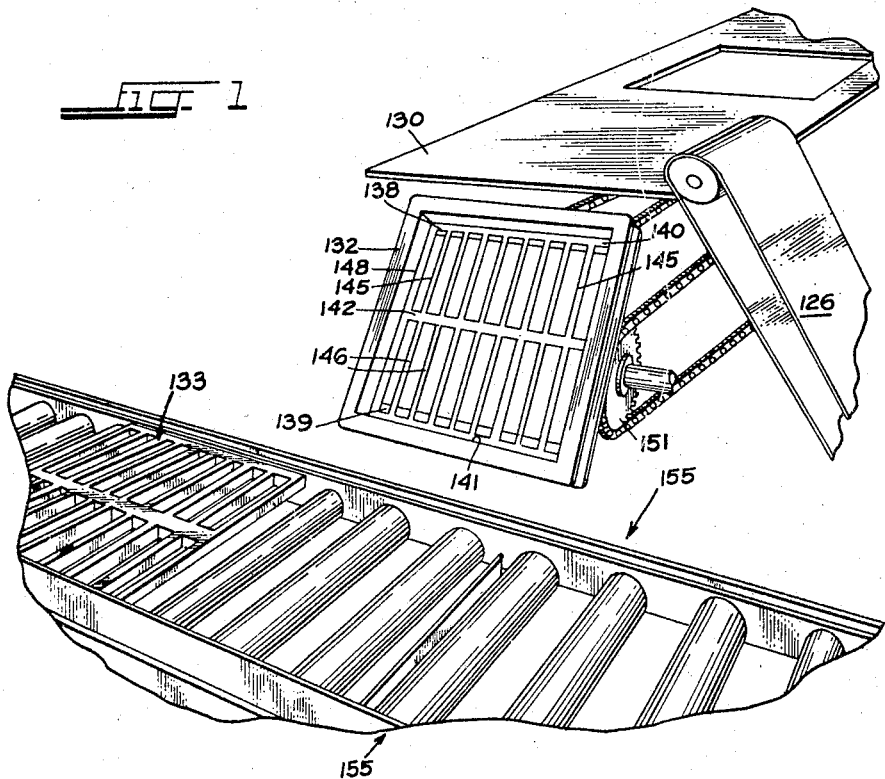
INVENTOR
CRESSWELL E. STEDMAN, Deceased,
By ELIZABETH K. STEDMAN, Administratrix
BY Charles B Cannon
ATT'Y.

United States Patent Office 3,441,244
Patented Apr. 29, 1969

---

3,441,244
MOLDING APPARATUS FOR MOLDING ACOUSTICAL TILE
Cresswell E. Stedman, deceased, late of Chicago, Ill., by Elizabeth K. Stedman, administratrix, Evanston, Ill., assignor to U. S. Perlite Corporation, Momence, Ill., a corporation of Delaware
Application Feb. 10, 1965, Ser. No. 431,734, now Patent No. 3,353,236, dated Nov. 21, 1967, which is a division of application Ser. No. 288,046, June 14, 1963, now Patent No. 3,222,434, dated Dec. 7, 1965, which in turn was a continuation-in-part of applications Ser. No. 542,231, Oct. 24, 1955, Ser. No. 614,783, Oct. 9, 1956, and Ser. No. 677,194, Aug. 9, 1957. Divided and this application Sept. 25, 1967, Ser. No. 671,537
Int. Cl. B28b 5/02
U.S. Cl. 249—160     1 Claim

---

ABSTRACT OF THE DISCLOSURE

A mold assembly is provided for molding acoustical tile having a differential density in the body thereof, such as disclosed in applicant's earlier Patent No. 3,222,434, granted December 7, 1965 on "Method of Producing an Acoustical Tile." The mold assembly comprises a generally rectangular-shaped mold tray having substantially vertically extending straight side walls and end walls and a bottom which is defined by spaced bars. The mold assembly includes a pallet insert for the mold tray and which is complementary in shape to the bottom of the mold tray. The pallet embodies interconnected bars of differing thicknesses and/or locations which are spaced to fit in the spaces between the bars in the bottom of the mold tray.

---

This application is a division of applicant's copending application, Ser. No. 431,734, filed Feb. 10, 1965, now Patent No. 3,353,236, issued Nov. 21, 1967, which is a division of application, Ser. No. 288,046, filed June 14, 1963, now Patent No. 3,222,434 granted Dec. 7, 1965, said application, Ser. No. 288,046, for said Letters Patent No. 3,222,434, having been a continuation-in-part of a consolidation of applicant's earlier applications, Ser. No. 542,231 filed Oct. 24, 1955; Ser. No. 614,783, filed Oct. 9, 1956; and Ser. No. 677,194, filed Aug. 9, 1957; now all abandoned.

This invention related to molding apparatus for molding acoustical tile.

The primary object of the present invention is to provide a new and improved molding apparatus for molding acoustical tile, having differential density in the body thereof, as disclosed in applicant's earlier Patent No. 3,222,434.

Other objects will appear hereinafter.

In the drawings:

FIG. 1 is a perspective view of a preferred embodiment of the new mold assembly arranged at a mold loading station;

FIG. 2 is a perspective view of a mold tray embodied in the new mold assembly;

FIG. 3 is a top plan view of the mold tray shown in FIG. 2;

FIG. 4 is a perspective view of a pallet screen embodied in the new mold assembly.

The tile molds consist essentially of two main parts, namely, a mold tray 132, FIGS. 1, 2, and 3 and a stripper pallet in the form of a screen or perforate plate 133, FIGS. 1 and 4. The stripper screen serves three main purposes. First of all, it enables the tile, after the same have been densified in a manner to be explained, to be easily removed from the mold trays 132, and at the same time thereby supported during the drying operation. Secondly, the stripper screen is configured in such a manner as to cooperate with a complemental configuration at the bottom of the mold trays which accounts for a highly advantageous density variation in the tile. Third, the stripper screen 133 enables the tile product when supported thereby in an oven to be uniformly heated and baked.

The mold tray 132 is of course of rectangular dimension and has four vertical side walls 132S, FIG. 1, which have a vertical dimension (1⅝″) predetermined as adequate to define a mold cavity into which will be deposited a quantity of the moist mix relayed to the filling station by the conveyor belt 126. Of course the top of each mold tray 132 is open to enable the filling operation to be performed, and the bottom of the mold cavity afforded by the mold tray 132 is defined by a plurality of spaced bars 136 and 137, the spaces between the bars being exposed at the bottom of the mold tray, which is to say that in appearance the bottom of the mold tray as shown in FIGS. 1 and 2 is in the nature of a grid. The bars 136 and 137 are rigidly joined to two opposed side walls of the mold tray by necked-down ties 136T and 137T, respectively, and are joined to one another at the midpoint of the tray bottom by like necked-down intermediate ties T. As shown in FIGS. 2 and 3, the ties T and the ties 136T and 137T are rectangular in cross section as are the bars 136 and 137, and the flat top surfaces of the ties are located below the top surfaces of the bars so that there are in effect three cross channels at the bottom of the mold tray. The ends of the bars 136 and 137 adjacent the side walls of the tray 132 are depressed at 138 and 139, FIGS. 1, 2 and 3, just prior to merging into the ties 136T and 137T.

Each stripper screen 133, FIG. 4 is so shaped as to have a pair of side cross bars 140 and 141 along two side margins which will fit into the corresponding two channels defined by the necked-down ties 136T and 137T leaving exposed the depressions 138 and 139 as shown in FIG. 1. The screen 133 has an intermediate cross bar 142 which will fit in the channel defined by the aligned and similarly dimensioned ties T in the mold pan. The screen 133 also includes spaced transverse bars 145 and 146 which will fit in the spaces between the bars 136 and 137, and the screen also includes a pair of end bars 148 and 149 which are joined at their ends to the ends of the side bars 140 and 141 to complete a closed bar rectangle defining the periphery of each screen 133. All of the bars comprising the screen are of the same cross-section dimension. It should finally be pointed out that each screen 133 is thin in comparison to the bars 136 and 137 of the mold tray. Consequently, when a screen is properly fitted in mold tray or pan 132, the top surfaces of the bars 136 and 137 project above all of the bars of the screen 133 as will be evident in FIG. 1 wherein there is shown at what constitutes a mold loading station a tray and screen assembly ready to move to the filling station. A screen when mounted in its mold tray completely closes all spaces at the bottom of the tray, but the bars 136 and 137, projecing above the screen bars, account for a variable density in and a rib effect at the back of the tile.

It will thus be seen from the foregoing description, considered in conjunction with the accompanying drawings, that the present invention provides a new and improved mold assembly and that the invention thus has the desirable advantages and characteristics and accomplished its intended objects including those hereinbefore pointed out and others which are inherent in the invention.

I claim:
1. A mold assembly for molding acoustical tile, or like material, comprising:
(a) a mold tray including
    (1) a generally rectangular-shaped body including:
        (2) side walls;
        (3) end walls; and having
        (4) a bottom including
            (a) bottom mold tray bars having
                (1) spaces therebetween;
(b) a pallet screen member including
    (1) a generally rectangular-shaped body removably mounted in the said mold tray and including
        (a) pallet screen bars spaced from each other and providing therebetween
        (b) spaces for the reception of the said bottom mold tray bars;
(c) the said bottom mold tray bars and the said pallet screen bars extending generally parallel to each other and extending generally parallel to the plane of the said body of the said mold tray and to the plane of the said pallet body of the said screen member, and the said mold tray bars filling the said spaces between the said pallet screen bars and projecting above the said pallet screen bars when the said pallet screen member is assembled in the said mold tray; and
(d) the said pallet screen member cooperating with the said mold tray to close the said bottom of the said mold tray when the said pallet screen member is assembled therein.

References Cited

UNITED STATES PATENTS

| 741,451 | 10/1903 | Britain | 249—176 |
| 1,633,715 | 6/1927 | Seelye | 249—31 |

FOREIGN PATENTS 1,007,341  2/1952  France.

J. SPENCER OVERHOLSER, *Primary Examiner.*

R. D. BALDWIN, *Assistant Examiner.*

U.S. Cl. X.R.

249—176